United States Patent [19]

Toyoda et al.

[11] Patent Number: 4,698,777
[45] Date of Patent: Oct. 6, 1987

[54] INDUSTRIAL ROBOT CIRCULAR ARC CONTROL METHOD FOR CONTROLLING THE ANGLE OF A TOOL

[75] Inventors: Kenichi Toyoda, Hino; Shinsuke Sakakibara, Komae; Tooru Mizuno; Ryuichi Hara, both of Hino, all of Japan

[73] Assignee: Fanuc Ltd., Minamitsuru, Japan

[21] Appl. No.: 700,706

[22] PCT Filed: May 25, 1984

[86] PCT No.: PCT/JP84/00268
§ 371 Date: Jan. 25, 1985
§ 102(e) Date: Jan. 25, 1985

[87] PCT Pub. No.: WO84/04829
PCT Pub. Date: Dec. 6, 1984

[30] Foreign Application Priority Data

May 26, 1983 [JP] Japan .............................. 58-092825

[51] Int. Cl.⁴ ...................... G05B 19/415; G06F 15/46
[52] U.S. Cl. .................................... 364/513; 364/169; 318/568; 318/573; 901/3; 901/14
[58] Field of Search ............... 364/169, 191, 513, 723; 318/568, 573–574; 901/2–5, 14–16, 23–24, 29, 41–42

[56] References Cited

U.S. PATENT DOCUMENTS

| 3,909,600 | 9/1975 | Hohn ............................... 364/513 X |
| 4,086,522 | 4/1978 | Engelberger et al. .............. 318/568 |
| 4,105,937 | 8/1978 | Tuda et al. ......................... 318/568 |
| 4,453,221 | 6/1984 | Davis et al. ......................... 364/513 |
| 4,528,632 | 7/1985 | Nio et al. ............................ 364/169 |
| 4,538,233 | 8/1985 | Resnick et al. ..................... 364/513 |
| 4,541,060 | 9/1985 | Kogawa ............................. 364/513 |
| 4,550,383 | 10/1985 | Sugimoto ........................... 364/513 |

Primary Examiner—Gary V. Harkcom
Attorney, Agent, or Firm—Staas & Halsey

[57] ABSTRACT

An industrial robot arc control method subjects the position of a working member to circular-arc control by interpolation while controlling the target angle of the working member with respect to a surface to be worked, which working member is mounted on the wrist of an industrial robot. The industrial robot circular arc control method includes obtaining corresponding points (P1, P2 . . . ; Q1, Q2 . . .;) of the tip and base of the working member (TC) at plural taught points for circular-arc control of the tip of the working member, which is mounted on a wrist (HD) of the robot, finding interpolated points of the tip and base of the working member by interpolation from the corresponding taught points, and obtaining command quantities for the motion axes of the robot from the interpolated points.

4 Claims, 7 Drawing Figures

INDUSTRIAL ROBOT CIRCULAR ARC CONTROL METHOD FOR CONTROLLING THE ANGLE OF A TOOL

BACKGROUND OF THE INVENTION

1. Field of the Invention

This invention relates to a method of controlling an industrial robot and, more particularly, to an industrial robot arc control method for subjecting the position of a working member to circular-arc control by interpolation while controlling the target angle of the working member with respect to a surface to be worked, where the working member is mounted on the wrist of an industrial robot.

2. Description of the Related Art

Industrial robots have found extensive use in recent years and are capable of performing increasingly sophisticated operations. These industrial robots have the capability to carry out a variety of tasks depending upon the kind of working member mounted at the distal end of the wrist thereof. Control of the robot differs depending upon the kind of task.

FIG. 1 is a view showing the construction of a common industrial robot. The illustrated robot is an articulated robot with movement along five axes. More specifically, the industrial robot depicted in FIG. 1 comprises a base BS which rotates about an axis E, a body BD which rotates about an axis D with respect to the base BS, an arm ARM which rotates about an axis C with respect to the body BD, and a wrist HD which rotates about an axis B with respect to the arm ARM, and which further rotates about an axis A. The robot is therefore an articulated robot having three fundamental axes and two wrist axes, for a total of five axes. An industrial robot of this kind controls the position and travelling velocity of the wrist HD by effecting control along the five axes, and performs a desired task using a working member mounted on the wrist HD. The kind of task and the type of control differ depending upon the type of working member, such as a hand or torch, mounted on the wrist HD. By way of example, an industrial robot for arc welding has a torch mounted at the tip of the wrist HD to serve as the working member, and the surface of a workpiece to be worked is subjected to arc welding along a desired path by means of the torch. In arc welding of this kind or in an operation such as gas cutting, there is the danger of a non-uniform welding or cutting operation unless the angle (target angle) of the torch or working member with respect to the workpiece surface is set to an optimum value. The robot therefore requires that the absolute angle of the torch be controlled by the wrist HD in dependence upon the inclination of the workpiece surface.

More specifically, the robot wrist HD has the rotational axis B with respect to the arm ARM, as well as the rotational axis A for the wrist itself, as shown in FIG. 2(A). When a torch TC is mounted at the distal end of the wrist as shown in FIG. 2(B), the target angle of the torch TC is capable of being varied to assume values of $\beta_1$, $\beta_2$ and $\beta_3$ by rotating the wrist about the axis B.

In a case where the workpiece has an arcuate shape, it is necessary to move the tip of the torch along a circular arc. Consequently, in the prior art, as shown in the explanatory view of FIG. 3, the positions of three points P1, P2 and P3 of the torch tip with respect to the arcuate surface of a workpiece WK to be worked are taught with the target angle $\beta_1$ being held constant, an interpolated point Pn is obtained from the taught points P1, P2 and P3 by an interpolation method, and arc travel control is performed by controlling the robot about each of its axes of motion in such a manner that the torch tip reaches the interpolated point Pn.

With such arc travel control, however, it is difficult to control the target angle of the torch TC with respect to the work surface, the target angle cannot be held constant during circular interpolation and cannot be varied at each of the taught points. Moreover, according to such conventional control, smooth and continuous control of the target angle of the torch TC with respect to the work surface is difficult to carry out.

SUMMARY OF THE INVENTION

An object of the present invention is to provide an industrial robot circular arc control method which makes it possible to control the target angle of a working member such as a torch mounted on the wrist of a robot when controlling the arcuate movement of the working member by interpolation.

The industrial robot circular arc control method of the present invention uses an industrial robot which possesses a plurality of motion axes along which motion is effected by a plurality of respective motors, and a control unit for controlling the motors of the robot. The control unit obtains corresponding points of the tip and base of a working member at plural taught points for circular-arc control of the tip of the working member, which is mounted on a wrist of the robot. The control unit also finds interpolated points of the tip of the working member by interpolation from the corresponding points of the tip of the working member and finds interpolated points of the base of the working member by interpolation from the corresponding points of the base of the working member. The control unit further obtains motion command quantities for the respective motion axes from both sets of the interpolated points obtained, and controls the motors on the basis of the command quantities. Therefore, according to the present invention, the target angle (attitude) of the working member mounted on the robot wrist can be controlled, and such control of the target angle can be executed by interpolation. Control can therefore be achieved with ease. Hence, in accordance with the invention, the target angle of the working member mounted on the robot wrist can be controlled continuously during motion of the working member. Therefore, in cases where the invention is applied to a welding or gas-cutting robot, welding or cutting conditions can be controlled in a uniform fashion to improve the quality of the particular activity.

DESCRIPTION OF THE PREFERRED EMBODIMENTS

The present invention will now be described in conjunction with the accompanying drawings to set forth the invention in greater detail.

Figure 1:
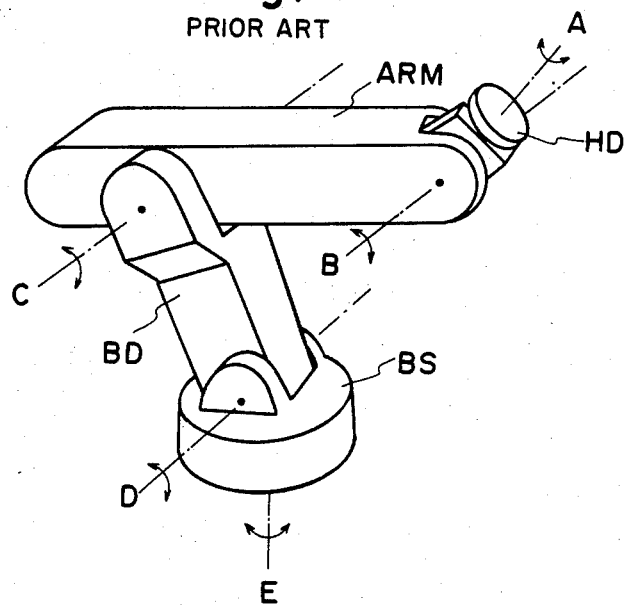
FIG. 1 is a view showing the construction of an industrial robot.
Figure 2A:
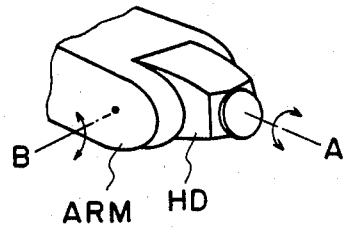
FIG. 2(A) and 2(B) are views for explaining target angle control.
Figure 2B:
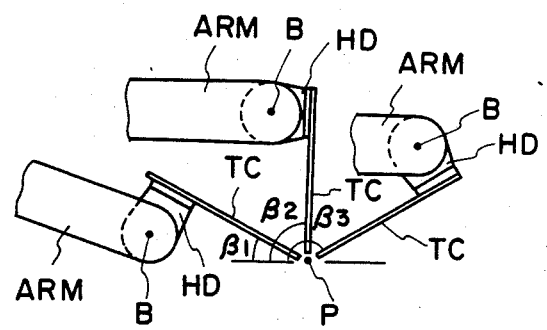
Figure 3:
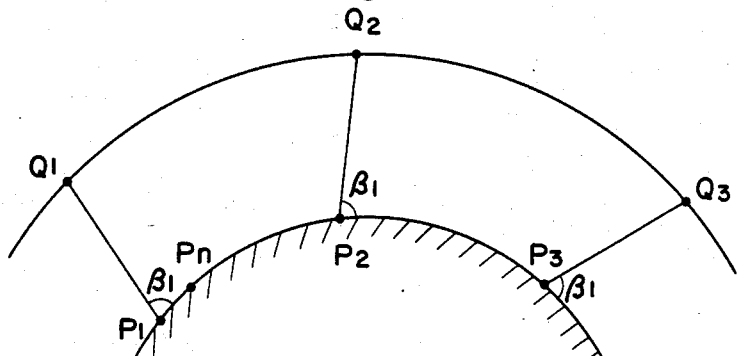
FIG. 3 is a view for describing a conventional circular arc control method.
Figure 4:
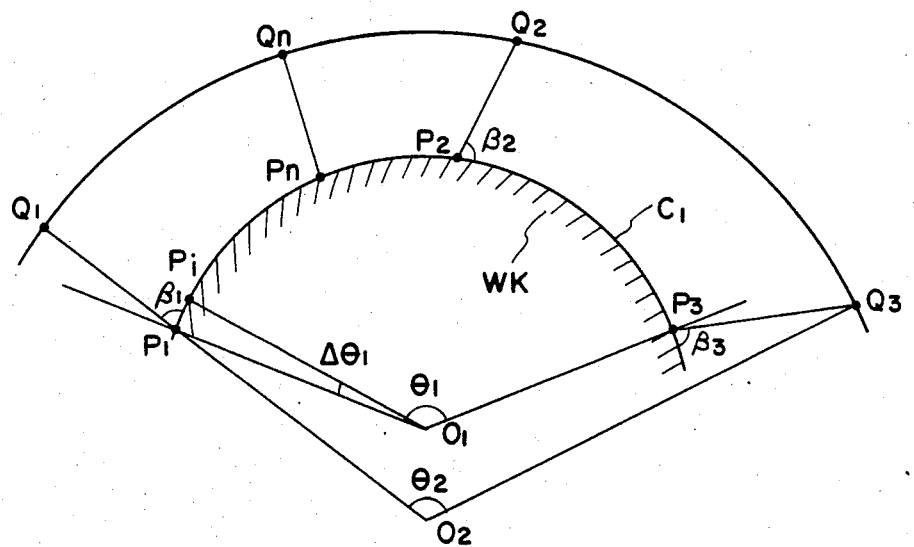
FIG. 4 is a view for describing a circular arc control method according to the present invention.
Figure 5:
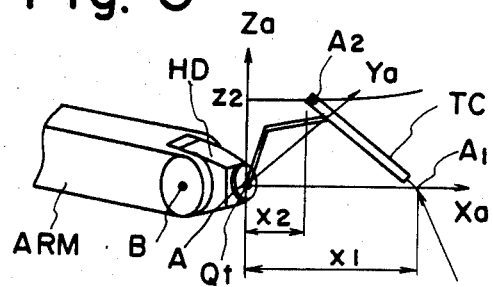
FIG. 5 is a view showing the manner in which a torch is mounted on the wrist of a robot.

FIG. 4 is a view for describing a control method according to the present invention, and FIG. 5 is a view showing the manner in which a torch is mounted on the wrist of a robot.

In accordance with the present invention, the method includes creating taught data by positioning, at respective predetermined target angles $\beta_1$ through $\beta_3$, the tip of a torch at points P1, P2 and P3 on a circular arc C1 defining the surface of a workpiece to be worked, as shown in FIG. 4, measuring the respective positions ($_\Delta x_1$, $_\Delta y_1$, $_\Delta z_1$), ($_\Delta x_2$, $_\Delta y_2$, $_\Delta z_2$) of the tip A1 and a base end A2 of a torch TC in a Cartesian coordinate system Xa-Ya-Za when the rotational angle of the robot about the axis A is zero, as shown in FIG. 5, and storing these positions in memory. In the Cartesian coodinate system Xa-Ya-Za, a predetermined point Q in the plane of the hand of the wrist HD is taken as the origin, the axis orthogonal to the plane of the hand and passing through the point Qt is taken as the Xa axis, and the axes orthogonal to the Xa axis and passing through the point Qt are taken as the Ya and Za axes.

This is followed by finding the positions ($_\Delta x'1$, $_\Delta y'1$, $_\Delta z'1$), ($_\Delta x'2$, $_\Delta y'$, $_\Delta z'2$) of the tip A1 and base A2, respectively, of the torch C1 at each taught point, where ($_\Delta x'1$, $_\Delta y'1$, $_\Delta z'1$), ($_\Delta x'2$, $_\Delta y'2$, $_\Delta z'2$) are positions in the coordinate system Xa-Ya-Za. For example, in the example of FIG. 5, ($_\Delta x_1$, $_\Delta y_1$, $_\Delta z_1$)=($x_1$, 0, 0) and ($_\Delta x_2$, $_\Delta y_2$, $_\Delta z_2$)=($x_2$, 0, $z_2$). Therefore, if the angle of rotation about the axis A at the taught points is $a_i$, then these positions will be given by the following:

$$\begin{pmatrix} \Delta x'_1 \\ \Delta y'_1 \\ \Delta z'_1 \end{pmatrix} = (1 \ \cos a_i \ \sin a_i) \begin{pmatrix} x_1 \\ 0 \\ 0 \end{pmatrix} \quad (1)$$

$$\begin{pmatrix} \Delta x'_2 \\ \Delta y'_2 \\ \Delta z'_2 \end{pmatrix} = (1 \ \cos a_i \ \sin a_i) \begin{pmatrix} x_2 \\ z_2 \\ z_2 \end{pmatrix} \quad (2)$$

Thereafter, taught position vectors in a revolute coordinate system at respective ones of the taught points are found from the above equations by using a well-known coordinate transformation matrix J:

$$\begin{pmatrix} X \\ Y \\ Z \\ a \\ b \\ c \end{pmatrix} = J \begin{pmatrix} \theta \\ W \\ U \\ \beta \\ \alpha \\ 1 \end{pmatrix}$$

It should be noted that X, Y, Z represent the position of the reference point Qt in the plane of the hand in the robot coordinate system, and a, b, c represent a vector normal to the plane of the hand.

This is followed by finding, from Eqs. (3), (4) below, a torch tip position vector $\vec{S}$ and a torch base position vector $\vec{R}$ in the robot coordinate system by using a taught position vector $\vec{Q}_{ti}$ at the taught point as well as the tip and base position vectors of the torch TC at each of the taught points given by the Eqs. (1), (2) above:

$$\vec{S} = \vec{Q}_{ti} + \begin{pmatrix} \Delta x'_1 \\ \Delta y'_1 \\ \Delta z'_1 \end{pmatrix} \quad (3)$$

$$\vec{R} = \vec{Q}_{ti} + \begin{pmatrix} \Delta x'_2 \\ \Delta y'_2 \\ \Delta z'_2 \end{pmatrix} \quad (4)$$

From the foregoing we may obtain position vectors $\vec{S1}$, $\vec{S2}$, $\vec{S3}$ and $\vec{R1}$, $\vec{R2}$, $\vec{R3}$ of the torch tip points P1, P2, P3 and torch base points Q1, Q2, Q3, respectively.

Next, the center $0_1$ and central angle $\theta_1$ of a circular arc C1 are found from the position vectors $\vec{S1}$, $\vec{S2}$, $\vec{S3}$ of the torch tip, and the length m of the circular arc $\widehat{P1P3}$ is found from the central angle $\theta_1$ and from the radius of the arc. Furthermore, since a travel velocity F is given in the teaching operation, the interpolation time T of the circular arc is given by the following:

$$T = m/F \quad (5)$$

Therefore, the angular velocity $\omega_1$ along the circular arc C1 is given by:

$$\omega_1 = \theta_1/T \quad (6)$$

and the interpolation angle $\Delta\theta_1$ of each interpolated point Pi is given by the following equation:

$$\Delta\theta_1 = \omega_1 \Delta T \quad (7)$$

(where $\Delta T$ represents unit time).

When the interpolation angle $\Delta\theta_1$ is found in this manner, the coordinates (position vectors) $\vec{Si}$ of the respective interpolated points Pi are obtained by calculation.

Next, the angular velocity $\omega_2$ of the circular arc $\widehat{Q1Q3}$ is found in accordance with the following:

$$\omega_2 = \omega_1 \cdot (\theta_2/\theta_1) \quad (8)$$

from each of the central angles $\theta_1$, $\theta_2$ and from the angular velocity $\omega_1$ along the circular arc $\widehat{P1P3}$.

As in Eq. (7), an interpolation angle $\Delta\eta_2$ is found from the following:

$$\Delta\theta_2 = \omega_2 \cdot \Delta T \quad (9)$$

and the coordinates (position vectors) $\vec{Ri}$ of the respective interpolated points $Q_i$ are found in a manner similar to that described above.

Thereafter, a torch inclination vector $\vec{I}$ is found from the following equation:

$$\vec{I} = \vec{Ri} - \vec{Si} \quad (10)$$

When $\vec{I}$ and $\vec{Si}$ have been found, robot position data in the revolute coordinate system are found by using a well-known transformation matrix for an inverse transformation from the Cartesian coordinate system to the revolute coordinate system. The robot is driven based on these data. Thenceforth, the position vectors $\vec{Si}$, $\vec{Ri}$ and the inclination vector $\vec{I}$ at the above-mentioned interpolated points Pi, Qi (i=1, 2, ...) are found in successive fashion, robot position data in the revolute coordinate system are found using these vectors, and the robot is driven on the basis of these position data. When this is done, the tip of the torch travels while traversing the circular arc C1, and the target angle becomes $\beta_1$, $\beta_2$ and $\beta_3$ at the respective taught points and changes smoothly from $\beta_1$ to $\beta_2$ and from $\beta_2$ to $\beta_3$ between mutually adjacent taught points. Assuming that teaching is performed with the target angle being held constant, the tip of the torch will move along a circular arc without any change in the target angle.

Described next will be the construction of a robot control unit for practicing the method of the present invention.

Figure 6:
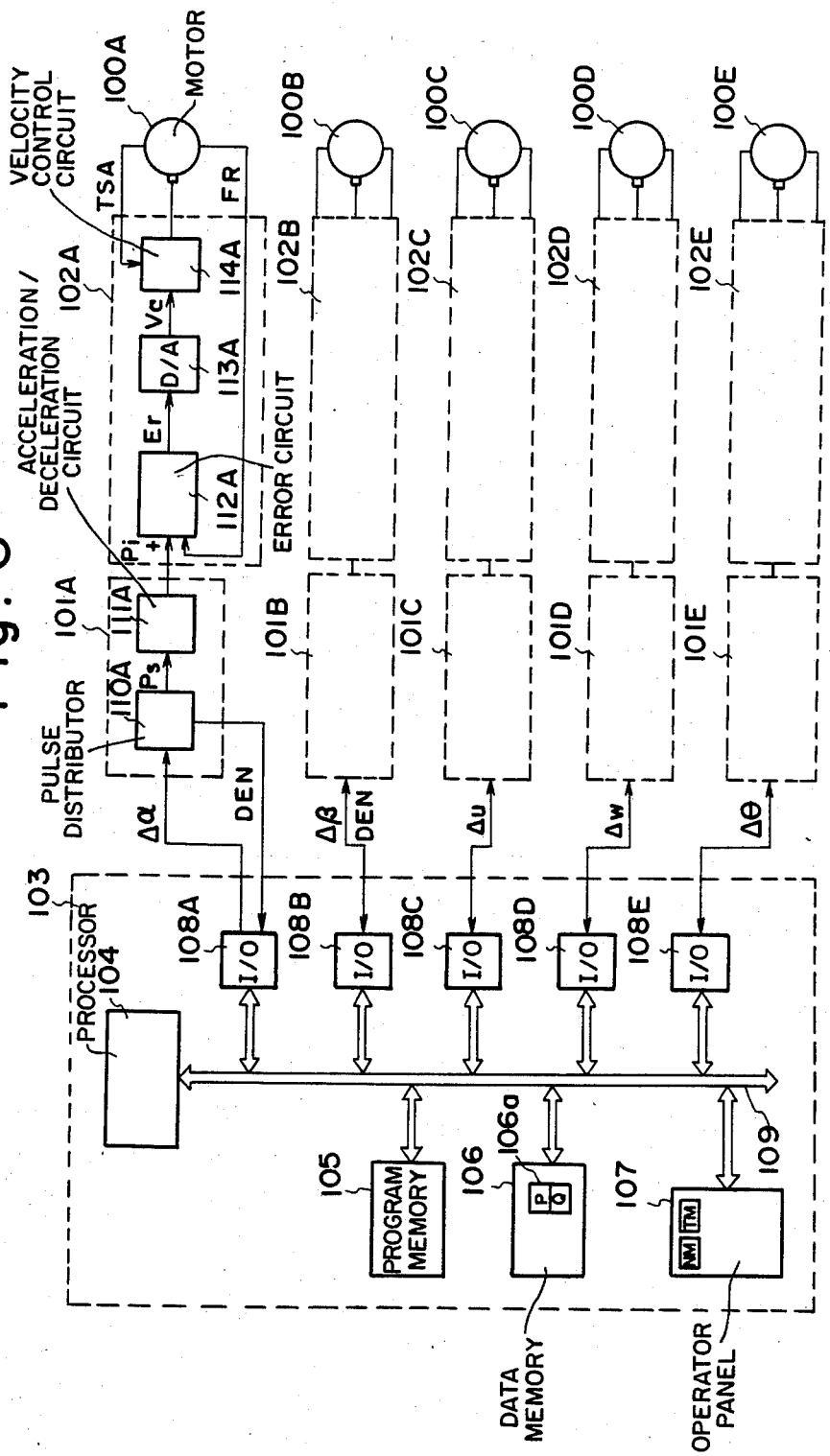
FIG. 6 is a block diagram of an embodiment of a robot control apparatus for practicing the circular arc control method according to the present invention.

FIG. 6 is a block diagram illustrating an embodiment of a robot control unit for practicing the present invention. In the Figure, numerals 100A, 110B, 100C, 100D and 100E denote motors for producing rotation about the axes A, B, C, D and E of the robot. Numerals 101A through 101E designate pulse distributing sections corresponding to the respective axes A through E. The pulse distributing sections, respectively include pulse distributors 110A through 110E for generating distributed pulses Ps the number of which is dependent upon movement commands for the axes A through E, and acceleration-deceleration circuits 111A through 111E which apply acceleration-deceleration control to the distributed pulses to produce command pulses Pi. Numerals 102A through 102E represent drive circuits corresponding to the respective axes A through E. The drive circuits, respectively, include error calculating and storage units (error counters) 112A through 112E for calculating and storing the difference (error) between the command pulses Pi, received from the respective acceleration-deceleration circuits 111A through 111E of the pulse distributors 101A through 101E, and feedback pulses FP provided by respective position sensors (not shown) of the motors 100A through 100E. Also included in the drive circuits are digital-analog (DA) converters 113A through 113E for converting the error Er, which results from the calculations performed by the error counters, into an analog quantity to generate a velocity command Vc, and velocity control circuits 114A through 114E for producing a difference between the velocity command Vc and an actual velocity TSA provided by respective velocity sensors (not shown) for the motors 100A through 100E. To simplify the drawing, the pulse distributor and other components constituting each of the pulse distribution sections 101B through 101E and drive circuits 102B through 102E are not shown. Numeral 103 denotes a robot controller constituted as a microcomputer and comprising an arithmetic circuit (processor) 104 for performing processing based on a control program described below, and a program memory 105 for storing the control program as well as necessary parameters. Also included are a data memory 106 for storing control data and calculation data and an operator's panel 107 having teach buttons as well as other control buttons and status indicators. Input/output ports 108A through 108E for performing an exchange of data with the pulse distributing sections 101A through 101E for the respective axes A through E of the robot, and an address/data bus 109 interconnecting the foregoing components are also included. Control programs stored in the program memory 105 include a position control program for producing control data to positionally control the motors of the axes A through E, and a teach control program for controlling movement of the axes in accordance with jog button feed, which is dependent upon a teach mode command, and for creating taught control data.

The operation of the arrangement embodied in FIG. 6 will now be described. In and ordinary operating mode, control data (the taught points P1 through P3 and Q1 through Q3), which have already been provided by a teaching or other main controller and stored in the data memory 106, are read out of the memory in sequential fashion by the processor 104 in accordance with the position control program in the program memory 105.

More specifically, for the interpolation calculation, the processor 104 finds the central angles $\theta_1$ and $\theta_2$ from the taught points P1 through P3 and Q1 through Q3 by calculation, and calculates the length m of the circular arc $\overarc{P1P3}$. Next, the processor 104 calculates the interpolation angle $\Delta\theta_1$ from Eqs. (5), (6) and (7) and finds the position vector $\vec{Si}$ at each of the interpolated points Pi. The processor 104 then calculates the interpolation angle $\Delta\theta_2$ from Eqs. (8) and (9), finds the position vector $\vec{Ri}$ at each of the interpolated points Qi, subsequently finds the inclination vector $\vec{l}$ from Eq. (10), performs the transformation into coordinates (motion angles of the motion axes) in the revolute coordinate system by using $\vec{l}$ and $\vec{Si}$, and feeds these coordinates into the input/output ports 108A through 108E via the bus 109. As an example, when $\alpha_1$ is calculated as a travel quantity (motion angle) for the A axis, the processor 104 produces as an output a stipulated quantity $_{66}\alpha$, which is part of the travel quantity $\alpha_1$, and the pulse distributor 110A produces distributed pulses of a number in accordance with $\Delta\alpha$. When the generation of the distributed pulses ends, the pulse distributor produces a distribution end signal DEN, which the processor 104 receives via the input/output port 108A and bus 109, and the processor responds by producing a subsequent stipulated quantity $\Delta\alpha$. Thereafter, the receipt of the distribution end signal and the generation of $\Delta\alpha$ are repeated in similar fashion to command or output $\alpha_1$ in its entirety. The same operations are performed with regard to the other axes B through E. When $\Delta\alpha$ is sent to the pulse distributor 110A, the latter immediately performs a pulse distribution calculation to produce the distributed pulses Ps. The pulses Ps are converted into command pulses Pi by the acceleration-deceleration circuit 110A and enter the error counter 112A to update its status incrementally in the positive (or negative) direction. As a result, the status of the error counter 112A becomes non-zero and the DA converter 113A converts the counter status into an analog voltage, thereby rotating the motor 100A via the velocity control circuit 114A to rotate the wrist HD about the A axis. When the motor 100A rotates, the position sensor produces one feedback pulse FP each time the motor 100A rotates a predetermined amount. The status of error counter 112A is decremented and, hence, updated, one count at a time whenever a feedback pulse FP is generated. Further, the actual velocity TSA of the motor 100A is provided by the velocity sensor, and the velocity control circuit 114A finds the difference between the actual velocity and the velocity command Vc to control the velocity of the motor 100A. The motor 100A is thus subjected to velocity and positional control and is rotated to a target position. The motors 100B through 100E for the other axes B through E, respectively, are controlled in similar fashion. The processor 104 repeats the foregoing operations in accordance with the position control program and moves the industrial robot to each of the interpolated points in accordance with the control data, whereby the tip of the torch held by the industrial robot is controlled for movement along a circular arc.

The processor 104 repeats the foregoing operations each time an interpolated point is calculated to eventually control the movement of the torch tip along the circular arc while controlling the target angle of the torch.

Though the present invention has been described in conjunction with an embodiment thereof, the invention is not limited to the above-described embodiment and various modifications can be made in accordance with the gist of the invention without departing from the scope thereof.

Thus, as set forth above, an industrial robot circular arc control method according to the present invention makes it possible to control the target angle (attitude) of a working member mounted on the wrist of the robot. The invention is therefore well-suited for application to a welding robot or gas cutting robot.

What we claim is:

1. An industrial robot circular arc control method for an industrial robot which possesses a plurality of motion axes along which motion is effected by a plurality of respective motors, and a control unit for controlling each of the motors of the robot, the control unit controlling each of the motors to move a tip of a working member, which is mounted on a wrist of the robot, along a circular arc, said method comprising the steps of:

storing positions of the tip and base of the working member at a predetermined rotational angle of the wrist, with a predetermined point Qt in the plane of the wrist of the robot serving as a reference;

positioning the tip of the working member at each taught point at a predetermined target angle and storing, as taught data, the position of the predetermined point Qt in the plane of the wrist and the rotational angle of the wrist at each taught point;

finding positions of the tip and base of the working member in a robot coordinate system based on said stored taught data and the positions of the tip and base of the working member where the predetermined point Qt in the plane of the working member serves as the reference, and using these positions as plural taught points of the tip and base of the working member;

obtaining corresponding points of the tip and a base of the working member at the plural taught points for circular-arc control of the tip of the working member;

finding interpolated points of the tip of the working member by interpolation from the corresponding points of the tip of the working member;

finding interpolated points of the base of the working member by interpolation from the corresponding points of the base of the working member;

obtaining motion command quantities for the respective motion axes from interpolated points obtained for the tip and the base; and controlling the motors on the basis of the command quantities.

2. An industrial robot circular arc control method according to claim 1, wherein said control unit finding corresponding points at a predetermined time on a circular arc connecting three taught points of the tip of the working member and on a circular arc connecting three taught points of the base of the working member, and obtaining motion command quantities for the respective motion axes of the robot based on an inclination vector connecting each of the corresponding points, and on said corresponding points of the cip of the working member.

3. A method of circular arc control for a too kept at a constant angle with respect to a surface of a workpiece, said method comprising the steps of:

(a) storing at least three taught point pairs for the tool, where each pair includes a tip point for a tip of the tool and a base point for a base of the tool;

(b) interpolating between the tip points to produce interpolated tip points and between the base points to produce interpolated base points, step (b) comprising the steps of:

(b1) converting the pairs into taught position vectors for each pair;

(b2) converting the taught position vectors into tip and base position vectors for each tip and base point;

(b3) calculating a tip central angle and a tip arc length for the tip position vectors;

(b4) calculating a tip angular velocity along an arc formed by the tip points in dependence upon the tip central angle, the tip arc length and tool velocity;

(b5) producing a tip interpolation angle from the tip angular velocity;

(b6) producing interpolated tip position vectors for interpolated tip points from the tip points and the tip interpolation angle;

(b7) calculating a base central angle from the base position vectors;

(b8) calculating a base angular velocity from the tip angular velocity, the tip central angle and the base central angle;

(b9) producing a base interpolation angle from the base angular velocity;

(b10) producing interpolated base position vectors for interpolated base points from the base points and the base interpolation angle; and (b11) producing a tool inclination vector from the interpolated base position vectors and the interpolated tip position vectors; and (c) controlling the tip and base positions of the tool in dependence upon the interpolated tip points and the interpolated base points.

4. An industrial robot circular arc control method for an industrial robot including motion axes along which motion is effected by respective motors, and a control unit for controlling each of the motors of the robot, the control unit controlling each of the motors to move a tip of a working member in accordance with a command along a circular arc, the working member mounted on a wrist of the robot and including a base at the wrist, said method comprising the steps of:

storing positions of the tip of the working member when positioned at at least three taught tip position points for controlling the tip of the working member while moving along the circular arc and storing base position points of the base of the working member corresponding to the tip;

determining a pair of corresponding angle points at a predetermined time, one of the angle points being located on an arc connecting the at least three tip position points and the other of the angle points being located on an arc connecting the corresponding base position points of the base of the working member; and obtaining motion command quantities for the respective robot motion axes based on an inclined vector connecting the pair of the corresponding angle points of the tip of the working member for controlling the motors based on the command.

* * * * *